United States Patent [19]

Conrad et al.

[11] Patent Number: 4,801,188
[45] Date of Patent: Jan. 31, 1989

[54] LIGHT GUIDE OPTICS

[75] Inventors: Bernhard Conrad, Erlangen; Günther Tressl, Bubenreuth, both of Fed. Rep. of Germany

[73] Assignee: Siemens Aktiengesellschaft, Berlin and Munich, Fed. Rep. of Germany

[21] Appl. No.: 12,346

[22] Filed: Feb. 9, 1987

[30] Foreign Application Priority Data

Feb. 7, 1986 [DE] Fed. Rep. of Germany ....... 3603928

[51] Int. Cl.⁴ .............................................. G02B 6/00
[52] U.S. Cl. ..................................... 350/96.10; 355/1; 358/901
[58] Field of Search ............... 350/96.10, 96.15, 96.27, 350/96.28; 250/227; 355/1; 358/901, 293, 294

[56] References Cited

U.S. PATENT DOCUMENTS

| | | | |
|---|---|---|---|
| 2,999,163 | 9/1961 | Beese | 350/96.1 X |
| 3,038,959 | 6/1962 | Beurle | 358/901 |
| 3,264,407 | 8/1966 | Headd et al. | 358/293 |
| 3,622,796 | 11/1971 | Harris | 350/96.1 X |
| 4,321,630 | 3/1982 | Kramer | 358/294 |
| 4,485,302 | 11/1984 | Tanaka et al. | 350/96.1 |
| 4,544,258 | 10/1985 | Takano | 355/1 |

FOREIGN PATENT DOCUMENTS

| | | | |
|---|---|---|---|
| 2020106 | 7/1970 | France . | |
| 56-111866 | 9/1981 | Japan | 355/1 |
| 1586572 | 3/1981 | United Kingdom . | |

OTHER PUBLICATIONS

W. H. Bliss et al., "Facsimile Scanning by Cathode-Ray Tube", RCA Review, vol. XV, No. 5, (Sep. 1954) pp. 275, 284, 285, and 290.

Primary Examiner—John D. Lee
Assistant Examiner—John Ngo
Attorney, Agent, or Firm—Hill, Van Santen, Steadman & Simpson

[57] ABSTRACT

A light guide optical device for guidance of light emitted from an original to an optoelectric transducer for converting the read out image of the original into electrical signals where the original is scanned line-by-line, is formed of a light conducting plate having a first linear side directed toward the original and a second side connected at the ends of the first side which is arcuately curved at least in regions. The plate includes a hole for accepting the transducer which receives light emitted from the surface of the plate at the hole.

11 Claims, 4 Drawing Sheets

PRIOR ART

LIGHT GUIDE OPTICS

BACKGROUND OF THE INVENTION

1. Field of the Invention

The present invention relates generally to an optical device for guiding light to an opto-electrical transducer from a line scanned original image.

2. Description of the Prior Art

A light guide optical device which is used for scanning a storage, or persistent, luminophore as disclosed in U.S. Pat. No. 4,485,302. In an installation for use in x-ray diagnostics, a fluorescent screen having a luminescent storage, or persistent, luminophore as a radiation-sensitive transducer is irradiated with x-rays to store a latent x-ray image. The luminescent storage fluorescent screen forms an original image which is excited to luminescence picture-element-by-picture-element by an additional radiation source, such as a laser, to thereby read out the image using the disclosed light guide optical device as a read-out means. During scanning of a line by the laser beam, light emitted by the fluorescent screen is acquired, or gathered, by the light guide optics at a linear input side. The disclosed light guide member also has an output side which is circularly bent into an annular shape and arranged at an opto-electric transducer, or photodetector. The output signal of the transducer is then supplied to a chain of video processing devices for reproduction of the x-ray picture.

The transition from the linear expanse of the light guide member to the annular, or circular, portion does not ensue abruptly, but gradually, since too great a part of the light would otherwise emerge from the light guide member and the repeated total reflections would be interrupted. The length of the light guide member is relatively great in comparison to the acquired line length. Particularly for short wave length light which is emitted by a storage luminophore, however, additional light losses result from absorption which is proportional to the length of the light guide member. Moreover, the manufacture of the disclosed light guide member is difficult and requires many processing steps.

SUMMARY OF THE PRESENT INVENTION

An object of the present invention is to provide a light guide optical device for line-scanned images that has only a slight dimension perpendicular to the direction of the scan line length so that light losses are reduced to a minimum.

This and other objects are achieved in accordance with the present invention in a light guide optical member formed of a light conducting plate having a first, linear, narrow side directed towards an original image and a second, arcuately-shaped, narrow side which joins opposite ends of the first linear side. The light conducting plate includes a hole for accepting a transducer which receives light emerging from the surface of the plate surrounding the hole. As a result of the form of the present light guide optical device, light entering the linear, narrow side is totally reflected at the curved, narrow side until it emerges at the hole and impinges the transducer; the transducer, thus, receiving nearly all light which enters the plate through the linear, narrow side for conversion into electrical signals. As a result of the position of the transducer in the hole in the light guide optical device, short light beam paths arise so that light losses are kept to a minimum.

Although identified herein as arcuately-shaped or curved, the second narrow side may include linear portions. Likewise, the first linear side may be somewhat curved, such as to accommodate a curved original, the identification "linear" and "curved" or "arcuate" merely used herein to denote general configurations.

The reflected light is further increased when the second, narrow side is surrounded by a mirror. An advantageous and compact structure is formed when the plate is aligned at a first angle relative to the original and when the first, linear side is aligned at a second angle relative to a surface normal to the plate. The first, linear side is aligned such that it describes an angle of approximately 45° relative to the original. It has proven advantageous to provide the first angle equal to approximately 60° and the second angle equal to approximately 15°.

Light emitted by the original is concentrated onto the first linear side when a curved, second mirror is disposed between the original and the edge of the first, linear side which lies at a distance from the original. The structure of the present light guide optical device is simplified when a scan beam for the original is conducted between the plate and the second mirror to impinge the original nearly perpendicularly.

The present invention is used in scanning an original image picture-element-by-picture-element to conduct the emitted light of the individual picture elements of a full line to an opto-electric transducer. The original, for example, is an x-ray film or a luminescent storage, or persistent, fluorescent screen in which an x-ray image is latently stored.

In a further development of the present invention, a loss-free, total reflection is provided in addition to the normal reflection when the first mirror is arranged at a slight distance from the second arcuate side. This is especially important because there are light paths with multiple reflections at the curved surface which would otherwise be subject to a high loss upon the multiple reflections. All such light paths are totally reflected when the mirror is not coupled to the second side. Light paths that having a small angle of incident onto the curved side have only one reflection at the mirror, total reflection is not possible. The first mirror may be simply fastened to the second arcuate side when the second side is slightly concavely curved in the direction of its smaller dimension. A mirror formed of metal-sputtered foil is connected at the second narrow side.

Light entering directly from the scanning beam to the plate is eliminated when the plate is formed bipartite, whereby a first part forms a main light guide having a hole for accepting the transducer and a second part forms a supplementary member that includes the first, narrow side. A strip shaped filter is arranged between mutually adjacent sides of the main light guide and the supplementary member. Light losses at the transmittance point of the filter are avoided when the cross-section of the main light guide is greater than that of the supplementary member, at least in the region of the filter. The incidence of lateral, unwanted light is prevented when the light guide optical device and the transducer are surrounded by a protective light-tight housing.

It has proven advantageous to form the curvature of the second narrow side as an evolute, at least in regions, the radii of the curvature having the largest values in the proximity of the first narrow side. The efficiency of the present light guidance device is especially high when two symmetrical evolutes of the second narrow side end at a light-sensitive surface of the transducer extending through the hole. A simple and reliable structure of the present light guide optical device is achieved when the second narrow side is arcuately formed in a first region extending from the first narrow side up to the intersection of the arcuate side with the tangent of the light sensitive surface of the transducer that intersects the first narrow side at a critical angle. The first region of the second, narrow side is executed arcuately such that at an arbitrary point of the first region the angle bisector between the tangent at the light sensitive surface of the transducer and a straight line that intersects the first narrow side at a critical angle resides perpendicularly to the second, curved side. In a second region joining thereto, tangents at the light-sensitive surface of the transducer reside perpendicularly to the curved second surface until the tangent resides perpendicularly to the first narrow side. A third remaining region of the second narrow side proceeds parallel to the first narrow side and is, thus, linear. The three regions are repeated symmetrically at each side of the transducer.

DESCRIPTION OF THE PREFERRED EMBODIMENTS

Figure 1:
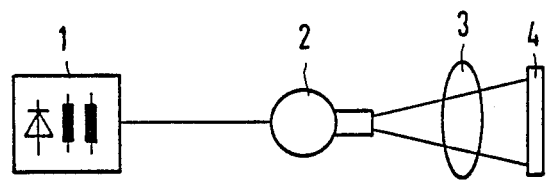
FIG. 1 is a schematic diagram of an exposure portion of a known x-ray diagnostic installation.

FIG. 1 shows a high voltage generator 1 which feeds an x-ray tube 2 that emits x-rays which penetrate a patient 3. The x-rays which have been attenuated by the patient 3 in accord with the transparency of the patient impinge a luminescent storage fluorescent screen 4, also designated an original. The incident radiation image generates holes (the absence of an electron) in the storage fluorescent screen 4, these holes being stored in a potential trap of the luminophore so that a latent image of the x-ray attenuation is stored in the storage fluorescent screen 4.

Figure 2:
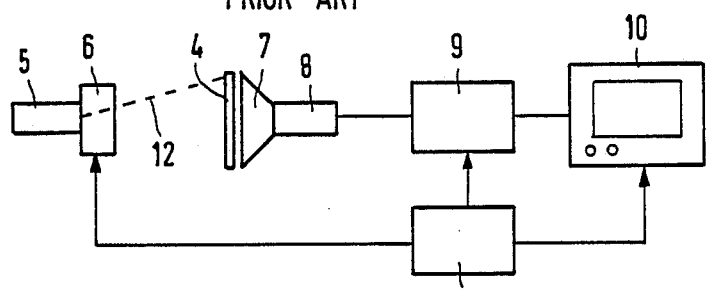
FIG. 2 is a schematic diagram of a reproduction portion of a known x-ray diagnostics installation having a light guide optical device.

For reproducing the latent image, the storage fluorescent screen 4, which corresponds to an original, is scanned by a laser beam 12 picture-element-by-picture-element, as shown in FIG. 2. The laser beam 12 is generated by a laser 5 and is swept line-by-line over the surface of the fluorescent screen 4 by a deflection means 6. The deflection means 6 for the laser 5, for example, includes a deflection mirror for vertical deflection and an electro-optical beam deflector for horizontal deflection. Vertical deflection, however, can also be achieved by a parallel feed of the fluorescent screen 4 perpendicular to the scan line. As a result of scanning with the laser beam 12, all picture elements lying on the storage fluorescent screen 4 are successively excited line-by-line and caused to luminesce.

A light guide optical element 7 acquires light emitted by the storage fluorescent screen 4 and conducts it to an opto-electric transducer 8 which receives the brightness of the scanned picture elements and converts it into an electrical signal. The individual analog output signals from the transducer 8 are supplied to a reproduction circuit 9 for the generation of a video signal for display on a monitor 10. The reproduction circuit 9 can include image stores, or memories, processing circuits and transducers. A control means 11 generates control clock signals for synchronization of the deflection means 6 with the reproduction circuit 9 and the monitor 10.

Figure 3:
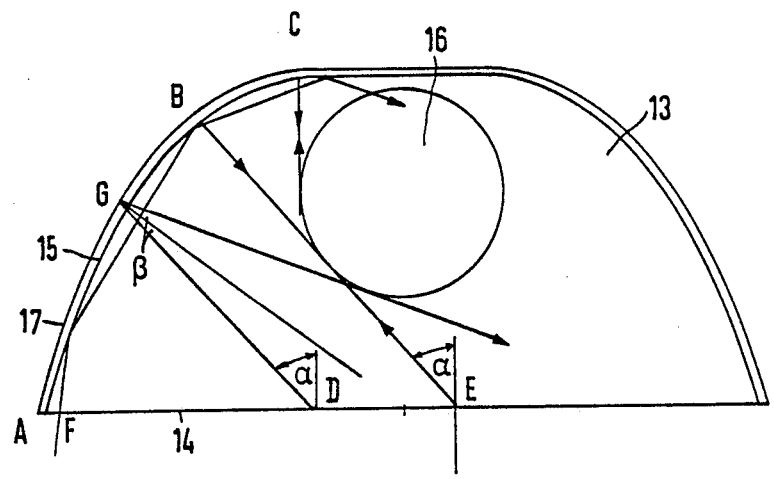
FIG. 3 is a plan view of a light guide optical device of the present invention.

Referring to FIG. 3, a light guide optical device of the present invention is shown, including a light conducting plate 13 that has a first, linear, narrow side 14. The ends of the first linear side 14 are connected by a second, narrow side 15 which is arcuately formed at least in areas. A circular hole 16 for accepting the transducer 8 is provided spaced from the middle of the first, linear side 14 at an upper region of the plate 13.

A mirror 17 which causes reflection of the light rays is disposed at the second, narrow side 15. When reflections at the surface of the mirror 17 are effected with losses and when loss-free, total reflections are desired, the mirror 17, as shown in FIG. 3, is not in optical contact with the second, narrow side 15. As a result, all reflections which impinge the second, narrow side 15 at an angle greater than an optical critical angle $\alpha$ are loss-free, total reflections.

Figure 4:
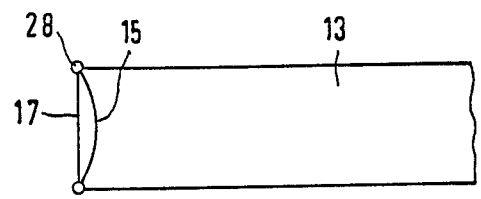
FIG. 4 is an enlarged, fragmentary view of the edge of the light guide optical device shown in FIG. 3.

A loss-free mirror is shown in FIG. 4 wherein the mirror 17 is formed of a thin, metal-sputtered foil. The second, narrow side 15 of the plate 13 is slightly concavely curved in the direction of its smaller dimension. The mirror 17 is stretched over the curvature as a band and is glued at a few locations with a transparent glue 28. As a consequence of the wide aperture angle at the first side 14, the application of loss-free total reflection and reflection from the mirror, local fluctuations of light transfer into the light guide member are not produced. In other words when scanning the fluorescent screen 4 with the laser beam 12, there are no light fluctuations dependent on the position of the beam 12.

The arcuate curvature of the second narrow side 15, as shown in FIG. 3, can be divided into individual regions. A first region extends from an intersection A of the two sides 14 and 15 to an intersection B at the intersection of the curvature of the side 15 with a tangent of the hole 16 which intersects the first linear side 14 at an optical critical angle $\alpha$. The tangent at the intersection B is also tangent to the diameter of a light sensitive surface of the transducer 8. The first edge region AB (between the intersection A and the intersection B) is arcuately executed such that, at an arbitrary point of the first region AB, an angle bisector between a tangent at the hole and a straight line 16 which intersects the first linear side 14 at the critical angle $\alpha$ is perpendicular to the curved side 15. The optical critical angle $\alpha$ is the largest possible exit angle which would enable a light ray proceeding nearly parallel to the linear side 14 to enter into the linear side 14. For the various possible materials, the optical critical angle α can be calculated from the following:

$$\sin \alpha = 1/n$$

where n is the optical index of refraction of the material used. For example, acrylic glass has a refractive index n=1.5 which yields a critical angle of 42°.

In a region BC of the curved narrow side 15 which extends from the intersection B up to an intersection C, the intersection C being the intersection of a tangent of the hole 16 that is perpendicular to the linear side 14, the curvature of the region BC is formed so that tangents of the hole 16 are perpendicular to the curvature of the arcuate side 15. A further region extending from the point C to the middle of the arcuate side 15 is formed as a straight line which is parallel to the linear side 14. The remaining portion of the arcuate narrow side 15 is symmetrical with respect to the above described regions.

Light rays entering the linear side 14 can follow various paths. When, for example, a light ray enters at a point E of the first linear side 14, then its exit angle from the linear side 14 is smaller than the critical angle α so that the light ray directly emerges from the lateral surface of the hole 16. When, by contrast, a light ray emerges at a point D on the linear side 14, then its angle to the perpendicular is also smaller than the critical angle α. This means, however, that the angle of incidence β on the second narrow side 15 is also smaller than the angle α so that the light ray exits from the lateral surface of the hole 16 after reflection at the mirror 17.

As shown, when a light ray enters at a point F along the linear side 14, then it is multiply totally reflected along the curvature of the arcuate narrow side 15 until it exits from the lateral surface of the hole 16, since the mirror 17 extends around the arcuate surface 15 at a slight distance therefrom. In this latter instance, no reflection occurs at the mirror 17, but instead a loss-free, total reflection occurs at the arcuate side 15 so that the illustrated light ray emerges unattenuated from the hole 16 of the plate 13 due to mirroring.

Figure 5:
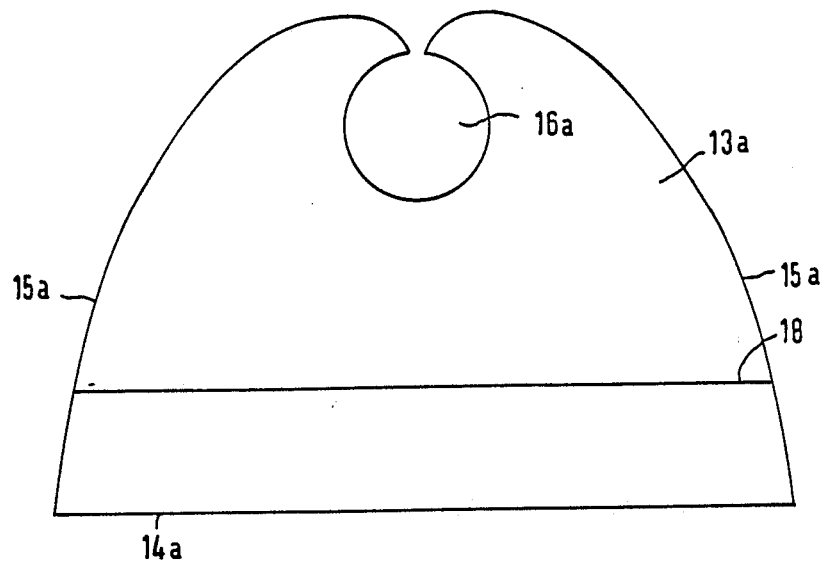
FIG. 5 is a plan view of an alternate embodiment of the light guide optical device of the invention.

In FIG. 5 is shown another embodiment of a light guide optic member 13a wherein a second, narrow side 15a is curved so that it is in a shape of an evolute whose radii of curvature has the greatest value in the proximity of a first, narrow side 14a. The two symmetrical evolutes of the second narrow side 15a proceed from the first, narrow side 14a at the light sensitive surface of the transducer 8 extending through a hole 16a. As a result, a small gap which serves for mechanical processing remains between the two parts of the second evolute side 15a. To achieve different line lengths along the first linear side 14, the plate 13a has only to be correspondingly shortened, such as shown by a line 18.

Figure 6:
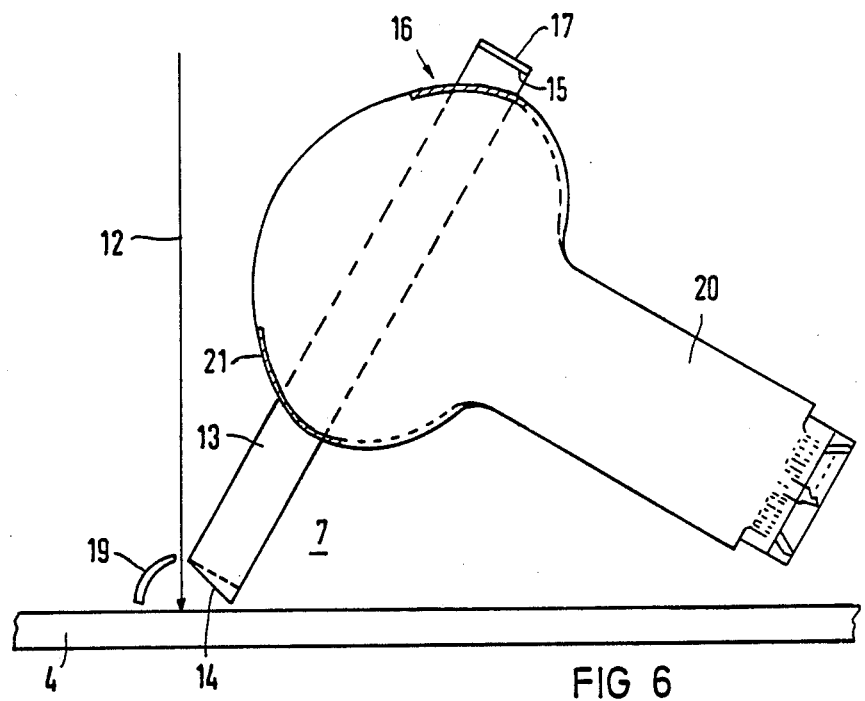
FIG. 6 is a side, elevational view showing the fundamental structure of a transducer portion of the invention.

Referring now to FIG. 6, a fundamental arrangement of a transducer part is shown. The first, linear side 14 of the light guide optics 7 is directed toward a line of a storage fluorescent screen 4 which is scanned by a laser beam 12. The plate 13 of the light guide optics 7 describes an angle of approximately 60° with the storage fluorescent screen 4 so that the light paths are kept short. The first, linear side 14 forms an angle of 15° relative to a perpendicular surface of the light guide optical member 7; thus, the first narrow side 14 describes an angle of 45° with the storage fluorescent screen 4. A curved, second mirror 19 is disposed between the storage fluorescent screen 4 and the edge of the first, linear side 14 at a distance from the storage fluorescent screen 4. The mirror 19 reflects the light rays emitted by the storage fluorescent screen 4 onto the first linear side 14. Between the second mirror 19 and the edge of the first linear side 14, which lies at a distance from the storage fluorescent screen 4, the laser beam 12 passes through a gap defined thereby and impinges the storage fluorescent screen 4, preferably perpendicularly. However, the laser beam 12 may alternatively scan from the side of the storage fluorescent screen 4 opposite the transducer portion.

The photomultiplier 20 is secured in the hole 16 of the plate 13 of the light guide optics 7 to form an opto-electric transducer 8. The photomultiplier 20 includes a photocathode 21 in the form of a light sensitive surface which extends around the side walls so that a photomultiplier 20 can receive light emerging from the lateral surfaces of the hole 16. In place of the photomultiplier 20 shown here, however, other photodetectors can be used so long as they gather light emerging from the surface limiting the hole 16. It would also be conceivable to employ a plurality of individual detectors in place of a single photomultiplier. The transducer 8 is glued in place with an optical glue (not shown). There is preferably an approximate coincidence of the refractive indexes of the light guide, the glue and the photomultiplier glass so that the photocathode is utilized up to the limit of the tangential light incidence angle. Without the glue, or some other substance such as an oil or grease, losses arise as a result of total reflection at the lateral surfaces of the hole 16. The lateral surfaces of the hole 16 are preferably shaped to abut the surface of the photomultiplier 20 for low light losses.

Figure 7:
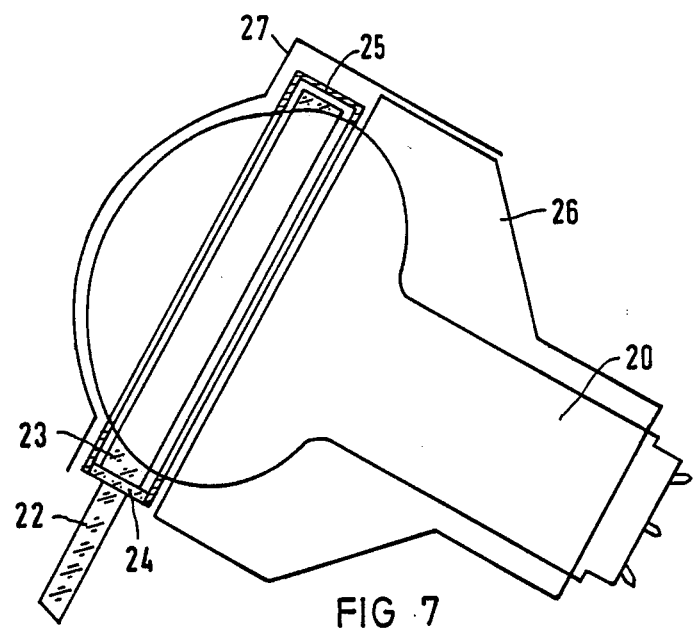
FIG. 7 is a side, elevational view, partially in cross section, showing the specific structure of a transducer portion of the invention, including a light guide optical device.
Figure 8:
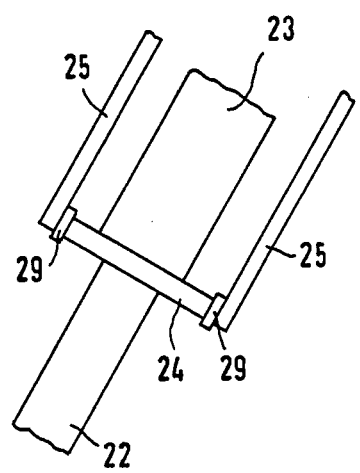
FIG. 8 is an enlarged detail of a portion of the transducer shown in FIG. 7.

FIG. 7 shows an advantageous embodiment of a transducer portion, including a light guide optics 7 and a transducer in the form of a photomultiplier 20. The light guide optical member 7 is formed of a supplementary member 22 and a main light guide 23, where the main light guide 23 has the photomultiplier 20 disposed in the hole 16 formed therein. The supplementary member 22 includes the first, narrow side 14. A filter 24 for filtering stray light emitted from the laser beam 12 is disposed between the linear parting surfaces of the main light guide 23 and the supplementary member 22. The light of the laser beam 12 is greatly attenuated by the filter 24. To prevent scattered light from entering laterally into the main light guide 23, a light protection housing 25 surrounds the main light guide 23. The light protection housing 25, as can be seen from FIG. 8, is connected to the filter 24 by a black glue 29. So that all of the light emerging from the supplementary 22 is gathered, the light emerging at up to a maximum angle of equal to the critical angle α, the entrance face of the main light guide 23 is of a larger dimension in length and width than the exit face of the supplementary member 22. As a result, light rays that emerge at the edge of the supplementary member 22 at the critical angle of 42°, for example, are also collected by the main light guide 23.

The exterior surfaces of the photomultiplier 20 that extend outside the light protective housing 25 are blackened. To prevent magnetic fields from reaching through onto the photomultiplier 20, the photomultiplier 20 is surrounded with a MU-metal hood 26 to which a MU-metal cap 27 is secured with a clip (not shown). Thus, the photomultiplier 20 is shielded against magnetic fields up to its input region.

Although modifications and changes may be suggested by those skilled in the art, it is the intention of the inventors to embody within the patent warranted hereon all changes and modifications as reasonably and properly come within the scope of their contribution to the art.

We claim:

1. A light guide optical device for guiding light emitted from an original to an opto-electrical transducer for conversion into electrical signals, the original being scanned line-by-line, comprising:
   a light conducting plate having a first narrow side directed towards the original and a second narrow side connecting at the ends of said first side, said second narrow side being curved at least in areas, said plate defining a hole extending through said plate and the transducer extending through said plate and fastened in said hole to receive light emerging from a surface of said plate that limits said hole and that travels into said hole toward the transducer.

2. A light guide optical device as claimed in claim 1, wherein said first narrow side is substantially linear.

3. A light guide optical device as claimed in claim 1, further comprising:
   a mirror surrounding said second narrow side.

4. A light guide optical device as claimed in claim 3, wherein said mirror is spaced a slight distance from said second narrow side.

5. A light guide optical device as claimed in claim 3, wherein
   said second narrow side is slightly concavely curved in the direction of a smaller dimension of said second side, and
   said mirror is formed of metal-sputtered foil stretched on said second narrow side.

6. A light guide optical device as claimed in claim 1, wherein
   said plate is disposed at a first angle relative to the original, and
   said first narrow side is disposed at a second angle relative to a surface normal of said plate, said first narrow side describing an angle of approximately 45° relative to the original.

7. A light guide optical device as claimed in claim 1, wherein said second narrow side has a curvature of an evolute at least in areas, the radii of curvature of said evolute having a largest value closed to said first narrow side.

8. A light guide optical device as claimed in claim 7, wherein said second narrow side is formed as two symmetrical evolutes ending at said hole.

9. A light guide optical device for guiding light emitted from an original to an opto-electrical transducer for conversion into electrical signals, the original being scanned line-by-line, comprising:
   a light conducting plate having a first narrow side directed towards the original and a second narrow side connecting at the ends of said first side, said second narrow side being curved at least in areas, said plate defining a hole for accepting the transducer to receive light emerging from a surface of said plate that limits said hole, wherein said plate is formed bipartite,
      a first portion of said plate is a light guide including said hole for accepting the transducer,
      a second portion of said plate has said first narrow side, and
   a strip-shaped filter disposed between mutually adjacent sides of said first portion and said second portion.

10. A light guide optical device as claimed in claim 9, wherein a cross-section of said first portion of said plate is greater than a cross-section of said second portion at least in a region adjacent said filter.

11. A light guide optical device for guiding light emitted from an original to an opto-electrical transducer for conversion into electrical signals, the original being scanned line-by-line, comprising:
   a light conducting plate having a first narrow side directed towards the original and a second narrow side connecting at the ends of said first side, said second narrow side being curved at least in areas, said plate defining a hole for accepting the transducer to receive light emerging from a surface of said plate that limits said hole,
   said second narrow side is arcuately formed in a first region extending from said first narrow side to an intersection of said second narrow side with a tangent of said hole that intersects said first narrow side at a critical angle, said first region being arcuately formed so that for an arbitrary point of said first region an angle bisector between a tangent of said hole and a straight light that intersects said first narrow side at the critical angle is perpendicular to said second side;
   a second region of said second narrow side being joined to said first reigon, said second region having a curvature so that tangents of said hole are perpendicular to said second side in said second region until said tangent is perpendicular to said first narrow side; and
   a third region of said second narrow side extending parallel to said first narrow side and adjoining said second region.

* * * * *